(12) United States Patent  
Yamamoto (10) Patent No.: US 6,325,514 B1  
(45) Date of Patent: Dec. 4, 2001

(54) PROJECTION TYPE DISPLAY DEVICE (75) Inventor: Chikara Yamamoto, Saitama (JP)

(73) Assignee: Fuji Photo Film Co., Ltd., Saitama (JP)

( * ) Notice: Subject to any disclaimer, the term of this patent is extended or adjusted under 35 U.S.C. 154(b) by 0 days.

(21) Appl. No.: 09/302,396

(22) Filed: Apr. 30, 1999

(30) Foreign Application Priority Data

Apr. 30, 1998 (JP) .................................................. 10-136063

(51) Int. Cl.$^7$ ...................................................... G03B 21/00
(52) U.S. Cl. ............................................... 353/31; 353/38
(58) Field of Search .......................... 349/5, 62; 353/31, 353/38, 102, 122; 359/457, 570, 574, 619, 621

(56) References Cited

U.S. PATENT DOCUMENTS 5,504,544 * 4/1996 Dreyer et al. ........................... 353/38  
5,758,940 * 6/1998 Ogino et al. ............................ 353/38  
6,109,752 * 8/2000 Itoh et al. ............................... 353/98

FOREIGN PATENT DOCUMENTS 3-111806  5/1991  (JP) .  
6-265887  9/1994  (JP) .

\* cited by examiner

*Primary Examiner*—Safet Metjahic  
*Assistant Examiner*—E P LeRoux  
(74) *Attorney, Agent, or Firm*—Young & Thompson (57) ABSTRACT

A projection type display device comprises a multiple light source arrangement, an integrator operative to make illumination rays from the multiple light source arrangement uniform in luminance intensity distribution in a plane perpendicular to the optical axis, a light bulb for modulating the illumination rays from the integrator according to image information and a projection lens for projecting an image. The integrator includes at least two integrator optical plates disposed with an axial separation in the optical axis and a deflection optical element which consists of Fresnel-shaped parallel surfaces at opposite sides divided into a same number of surface sections as a number of said light source assemblies to reduce bundles of rays in size and translate the bundles of rays toward the optical axis.

14 Claims, 9 Drawing Sheets

PROJECTION TYPE DISPLAY DEVICE

BACKGROUND OF THE INVENTION

1. Field of the Invention

The invention relates to a projection type display device for enlarging and projecting an image displayed on a light bulb onto a screen, and, more particularly, to a projection type display device equipped with an improved integrator for providing uniform distribution of illumination with which a light bulb is lighted up.

2. Description of Related Art

Relay-condenser illumination systems, which have been known as a kind of Köhler's illumination system, form an image of a light source at a focal point of a condenser lens which is in a close proximity of a pupil of a projection lens and project the light source image at an infinite distance. Such a relay-condenser illumination system prevents or significantly reduces uneven illumination due to uneven luminance intensity distribution of the light source. The issue of uneven illumination still remains in the relay-condenser illumination system with a light source having an uneven luminance intensity distribution characteristic such as a xenon lamp, a halogen lamp and a metal halide lamp. There have been known various integrator type illumination systems incorporating lens arrays or lenticular plates which eliminate uneven illumination due to uneven luminance intensity distribution of a light source. Such an integrator type illumination system is known from, for example, Japanese Unexamined Patent Publication No. 3-111806.

Further, various forms for dividing a bundle of rays have been known in the field. The integrator type illumination system includes a first integrator optical plate (which is generally called a second fly-eye lens plate), a second integrator optical plate (which is generally called a first fly-eye lens plate) and a field lens disposed in an optical axis in this order after a concave mirror type illumination optical arrangement. Each of the first and second integrator optical plate consists of a number of lens elements arranged in an ordinary matrix thereon. The first integrator optical plate divides a bundle of rays from the concave mirror type illumination optical arrangement which has uneven luminance intensity into bundles of rays as many as the number of lens elements thereof. The respective bundle of rays are reduced in unevenness of luminance intensity as compared with the original bundle of rays. The second integrator optical plate deflects and directs the respective bundles of rays toward an area to be illuminated. The bundle of rays are overlapped on the area by the field lens to form illumination with less uneven luminance intensity distribution.

As one of the integrator type illumination systems provided with two integrator optical plates, Japanese Unexamined patent publication No. 6-265887 describes a projection type display device incorporating a multiple light source arrangement which has a plurality of light sources disposed symmetrically with respect to an optical axis with intention to provide a satisfactory quantity of illumination light. Typically, such an illumination device forms a secondary light source on a surface of the second integrator plate in which a pupil of the projection lens is situated. The secondary light source has uneven luminance intensity distribution on the surface of the second integrator plate owing to the difference among luminance intensity distribution characteristics of the light source arrangements. In particular, the projection type display device with a multiple light source arrangement which includes a plurality of light sources disposed symmetrically with respect to an optical axis provides luminance intensity distribution on a surface of the second integrator plate, in which a pupil of the projection lens is situated, with a peak at a certain distance from the optical axis. The projection lens typically has an image forming characteristic that shows the best performance up close to the optical axis and is gradually aggravated with an increase in lateral distance from the optical axis. Therefore, in the case where a peak of luminance intensity distribution, which governs an image forming quality, is situated on a plane including the pupil of the projection lens at a certain distance from the optical axis, it is difficult for the projection lens to fulfill its essential image forming performance.

In order to eliminate the problem, the applicant of this application has proposed a projection type display device with a multiple light source arrangement in Japanese Unexamined Patent Publication No. 11-44920. This projection type display device two wedge-shaped prisms disposed at a specified axial separation between a light source arrangement and an integrator or incorporated in the integrator. The first wedge-shaped prism reflects a bundle of rays from the light source arrangement toward the optical axis, and then the second wedge-shaped prism reflects the bundle of rays so as to be parallel to the optical axis. While the projection type display device is superior on the point that it secures the essential image forming performance of the projection lens by means of shifting a peak of luminance intensity distribution regarding each light source toward the optical axis on the plane including the pupil of the projection lens, nevertheless, since the wedge-shaped prism has a large thickness, arranging the two wedge-shaped prisms at a specified axial separation provides aggravation of compactness of the overall integrator and an increase in manufacturing cost due to uniqueness of the wedge-shaped prism.

SUMMARY OF THE INVENTION

It is therefore an object of the invention to provide a projection type display device with a multiple light source arrangement having a plurality of light sources arranged symmetrically with respect to an optical axis thereof and an integrator having two integrator optical plates which operates to shift a peak of luminance intensity distribution toward the optical axis on the plane including the pupil of a projection lens so as to make illumination uniform with an effect of securing the essential image forming performance of the projection lens.

It is another object of the invention to provide a projection type display device with a multiple light source arrangement having a plurality of light sources arranged symmetrically with respect to an optical axis thereof and an integrator having two integrator optical plates which realizes overall compactness and a low manufacturing cost of the integrator.

The foregoing objects of the invention are accomplished by a projection type display device with a multiple light source arrangement including at least two light source assemblies, an integrator operative to make illumination from the multiple light source arrangement uniform in luminance intensity distribution in a plane perpendicular to the optical axis, a light bulb for modulating light from the integrator according to image information and a projection lens for projecting an image formed by the light modulated by the light bulb. The integrator comprises at least two integrator optical plates disposed with an axial separation in the optical axis to make bundles of illumination rays from the light source assemblies uniform in quantitative distribution and deflection optical means, which is preferably disposed in the optical axis between the light source assemblies and the integrator operative to reduce a size of each bundle of illumination rays and shift each bundle of illumination rays in parallel with and toward the optical axis with a shift ratio greater than a reduction ratio of the bundle of illumination rays. The deflection optical means consists of Fresnel-shaped parallel surfaces at opposite sides, each Fresnel-shaped surface being divided into a same number of surface sections as a number of the light source assemblies.

According to a preferred embodiment, the projection type display device may have each surface section formed in a rectangular shape. The surface section may consists of a plurality of parallel bands inclined at regular angles in a same direction with respect to the optical axis and leveled with one another.

The deflection optical means may comprise first and second deflection optical plates each of which is formed with one of the Fresnel-shaped parallel surfaces at one side and a flat surface at another side. The first and second deflection optical plates are arranged with their flat surfaces facing each other and movable relatively to each other along the optical axis.

BRIEF DESCRIPTION OF THE DRAWINGS

The above and other objects and features of the present invention will be understood from the following description of a specific embodiment thereof when considering in conjunction with the accompanying drawings, in which.

DETAILED DESCRIPTION OF THE SPECIFIC EMBODIMENT

The term "shift ratio" as used herein shall mean and refer to a ratio of shifted distance of a bundle of rays radially toward the optical axis relative to a radial distance at which the bundle of rays is situated before a shift, and the term "reduction ratio" as used herein shall mean and refer to a ratio of reduced diameter of a bundle of rays before a shift of the bundle of rays relative to that after the shift. The reduction ratio of a bundle of rays due to a shift of the bundle of rays toward the optical axis includes 1 (one). Further, the term "Fresnel-shaped" as used herein shall mean and refer to a surface appearance which has a plurality of coaxial bands inclined at regular angles with respect to the optical axis and leveled with one another like a Fresnel lens so as thereby to eliminate part of a Fresnel-shaped element unconcerned in refraction with the result of reducing the thickness of the Fresnel-shaped element.

Figure 1:
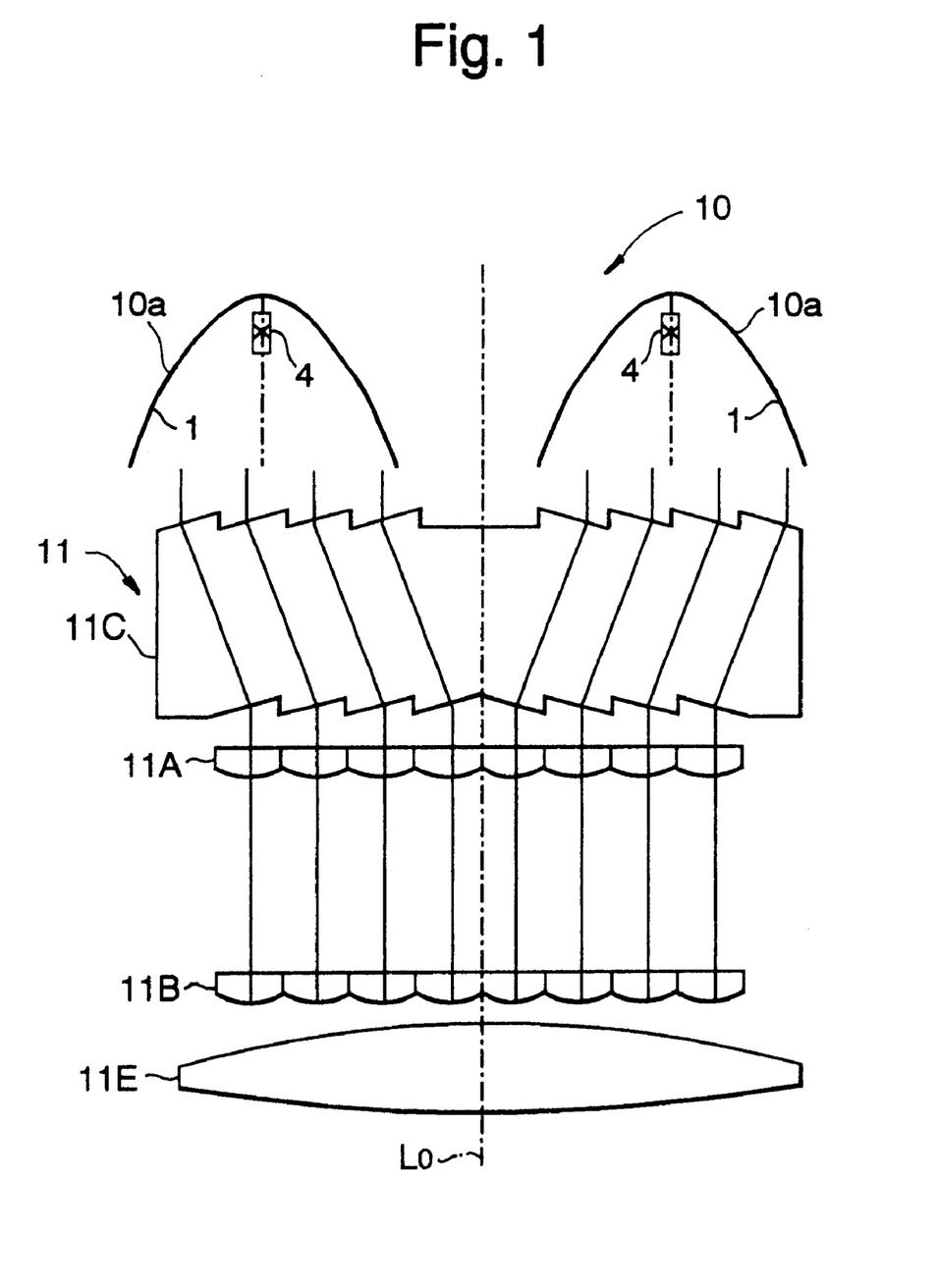
FIG. 1 is a schematic view of a main part of a projection type display device in accordance with an embodiment of the invention.
Figure 2:
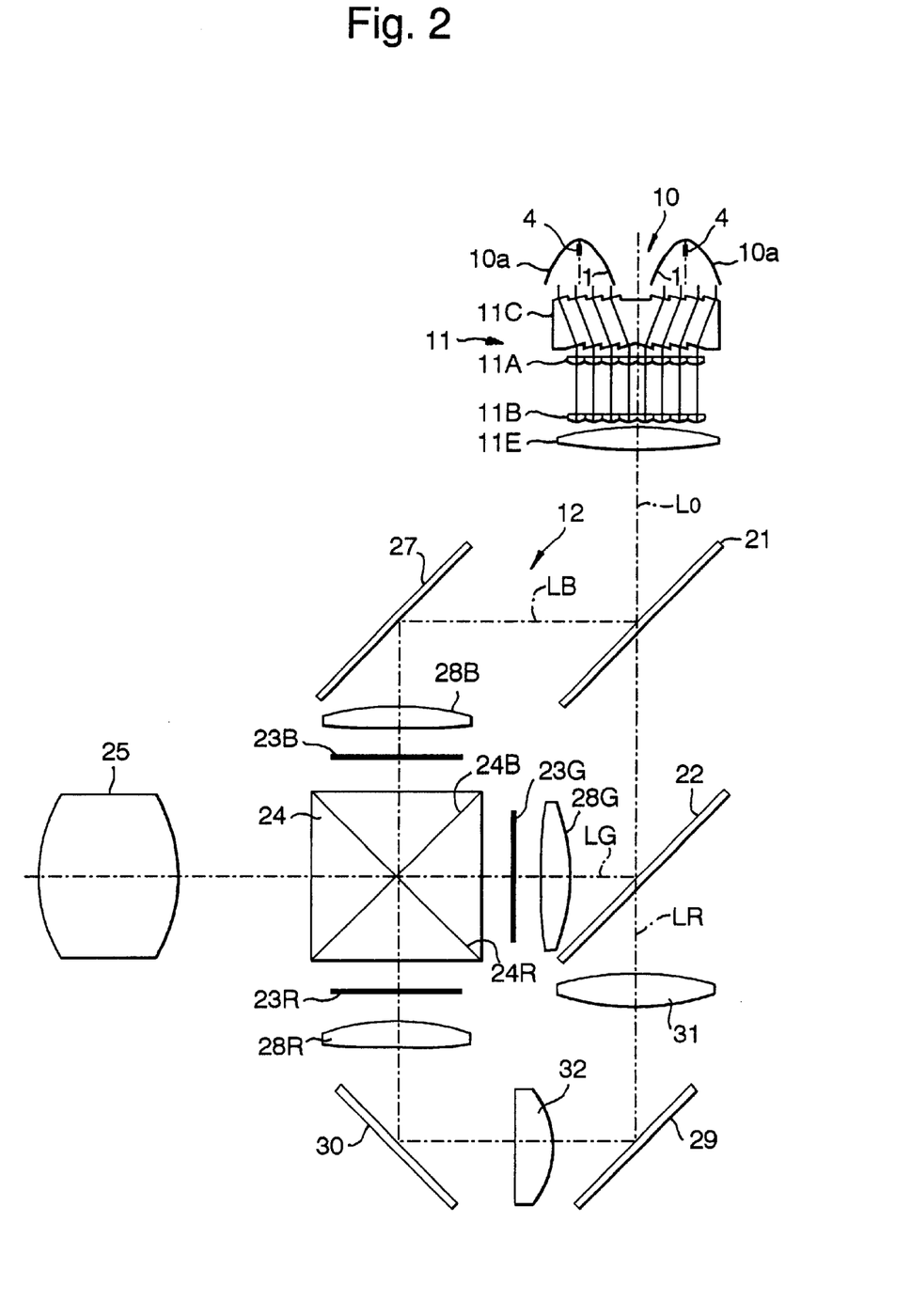
FIG. 2 is a schematic view of a main part of a projection type display device in accordance with an embodiment of the invention.

Referring to the drawings in detail and, in particular, to FIG. 1 schematically showing a projection type display device in accordance with an embodiment of the invention, a projection type display device comprises an illumination optical system 10, an integrator 11 operative to mix rays from light emitting sources of the illumination optical system 10 to provide uniform light quantity distribution and a projection optical system 12 for projecting an image onto a remote screen. As shown in FIG. 2, the illumination optical system 10 incorporates a plurality of, for example four in this embodiment, light source assemblies (only two of which are shown in FIG. 2) 10a arranged symmetrically with respect to an optical axis Lo of the illumination optical system 10. Each light source assembly 10a includes a paraboloide reflector 1 and a light emitting source 4, for example a discharge tube such as a xenon lamp and a metal halide lamp, disposed at a focal point of the paraboloids mirror reflector 1. Rays emanating from each light emitting source 4 are reflected by the paraboloide reflector 1 to form a bundle of rays in parallel with the optical axis Lo and travel forward to the integrator 11. The integrator 11 includes a deflection plate 11C, a pair of fly-eye lens plates, namely a first fly-eye lens plate 11B and a second fly-eye lens plate 11A disposed with a specified axial separation and a biconvex field lens 11E arranged in this order from the incident side along the optical axis Lo. The deflection plate 11C deflects the bundles of rays incident thereon to translate or shift them as parallel toward the optical axis Lo so as thereby to cast circular illumination spots with each adjacent margins partly overlapping each other on an incident surface of the second fly-eye lens plate 11A. The first and second fly-eye lens plates 11B and 11A cooperate to make the circular illumination spots cast on the second fly-eye lens plate 11A focus on liquid crystal panels 23B, 23G and 23R of the projection optical system 12 which will be described in detail later. The projection optical system 12 includes dichroic mirrors 21 and 22 and reflection mirrors 27, 29 and 30, liquid crystal panels 23B, 23G and 23R, a color composing prism 24 and a projection lens system 25. The dichroic mirror 21 is disposed at a right angle in the optical axis Lo to reflect blue component light (LB) only and transmit the remaining component light therethrough. The reflection mirror 27 is disposed in parallel with the dichroic mirror 21 to deflect the blue component light (LB) at a right angle and direct them toward the liquid crystal panel 23B. A field lens 28B makes the blue component light (LB) parallel each other. The dichroic mirror 22 is disposed at a right angle in the optical axis Lo and in parallel with the dichroic mirror 21 to reflect green component light (LG) only toward the liquid crystal panel 23G and transmit red component light (LR) therethrough. A field lens 28G makes the green component light (LG) parallel each other. The reflection mirror 29 is disposed at a right angle in the optical axis Lo and in parallel with the dichroic mirror 22 to deflect the red component light (LR) at a right angle. The reflection mirror 30 is disposed at a right angle with respect to the reflection mirror 29 to deflect the red component light (LR) reflected by the reflection mirror 29 at a right angle and direct them toward the liquid crystal panel 23R. A field lens 28R makes the red component light (LR) parallel each other. The color composing prism 24, which takes a form of cross prism, has surfaces intersecting perpendicularly to one another and is provided with dichroic surfaces 24B and 24R intersecting perpendicularly to each other to compose the blue, green and red component light and direct the composed light toward the projection lens 25. The liquid crystal panels 23B, 23G and 23R are positioned at regular distances from the color composing prism 24, respectively. The optical elements are arranged so as to provide equal optical path lengths, apparently or substantially, for blue and green light. In order to make the optical path length for red component light equal to those for blue and red component light, the projection optical system 12 further includes fields lenses 31 and 32 disposed between the dichroic mirror 22 and the reflection mirror 29 and between the reflection mirrors 29 and 30, respectively.

Symmetrical arrangement of the light sources with respect to an optical axis, like the light source assemblies 10a of the illumination optical system 10 provides a light quantity distribution of an illumination spot on the incident surface of the second fly-eyes lens plate 11A with a peak remote from the optical axis Lo in a radial direction. On the other hand, the projection lens 25 has an image forming characteristic that shows the best performance up close to the optical axis of the lens and is gradually aggravated with an increase in radial distance from the optical axis Lo. Therefore, when a peak of light intensity distribution of the illumination spot on a plane including the pupil of the projection lens 25 is remote far from the optical axis Lo, it is difficult for the projection lens 25 to form a high quality image. For this reason, the deflection plate 11C is incorporated between the illumination optical system 10 and the combined fly-eye lens plates 11A and 11B to direct incoming parallel bundles of rays from the light source assemblies 10a toward the optical axis Lo so as thereby to translate the peak of light intensity distribution of the illumination spot on the pupil plane of the projection lens 25 as closely to the optical axis Lo as possible.

Figure 3A:
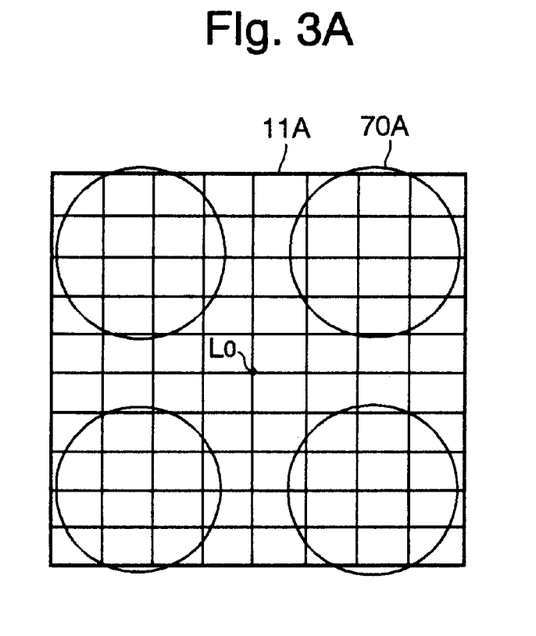
FIGS. 3A and 3B are illustrations showing illumination spots on a fly-eye lens plate of the projection type display device.
Figure 3B:
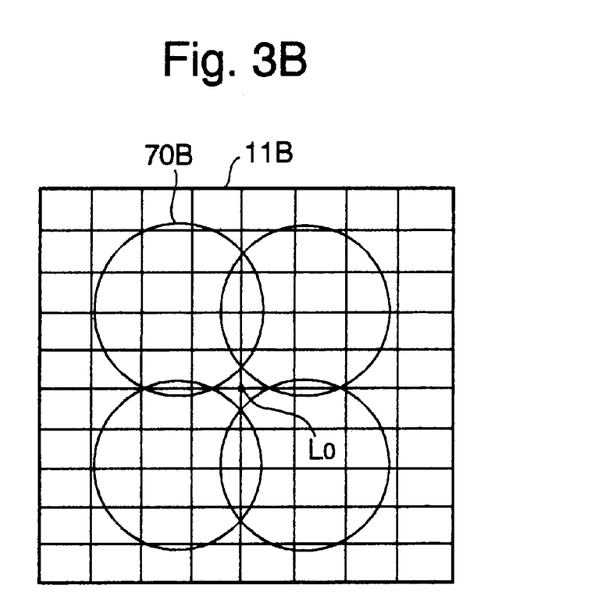

Specifically, in the illumination optical system 10 with four light source assemblies 10a arranged symmetrically with respect to the optical axis Lo, the circular illumination spots 70A directed toward the integrator 11 are spatially positioned with respect to the second fly-eye lens plate 11A before deflected by the deflection plate 11C as shown in FIG. 3A. After deflected by the deflection plate 11C, the circular illumination spots 70B are translated or shifted as parallel toward the optical axis Lo and cast with each adjacent margins partly overlapping each other on the second fly-eye lens plate 11A as shown in FIG. 3B.

Figure 6A:
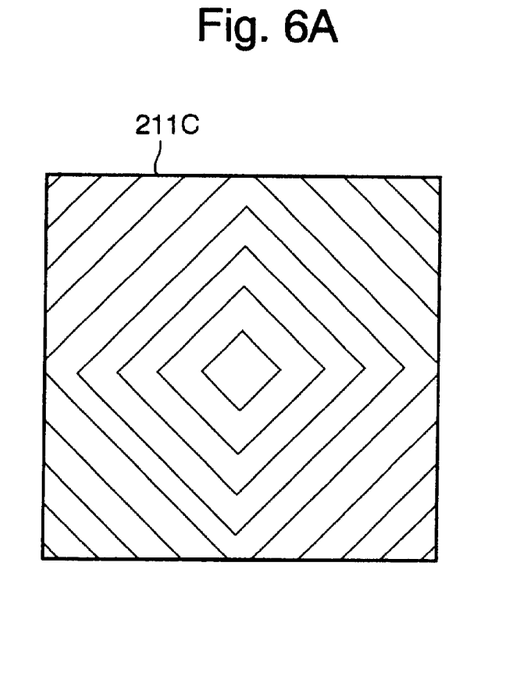
FIGS. 6A and 6B are schematic conceptional views showing a deflection plate installed in the projection type display device of FIG. 1 or 5.

The deflection plate 11C is defined by upper and under surfaces formed with coaxial rectangular bands (see FIG. 6A showing one surface denoted by a reference character 211C) thereon which have equal widths identical with the diameter of an eye-element of the fly-eye lens plate and are inclined at regular angles with respect to the optical axis Lo and leveled with one another, forming a serrate section as shown in FIG. 1. The corresponding rectangular bands of the upper and lower surfaces are parallel to each other. The rectangular band of the upper surface reflects a bundle of rays incident in parallel to the optical axis Lo thereupon toward the optical axis Lo, and the rectangular band of the under surface reflects the bundle of rays incident at an angle thereupon in parallel to the optical axis Lo. Accordingly, a bundle of rays passing through the deflection plate 11C is translated or shifted in parallel toward the optical axis Lo.

Figure 4A:
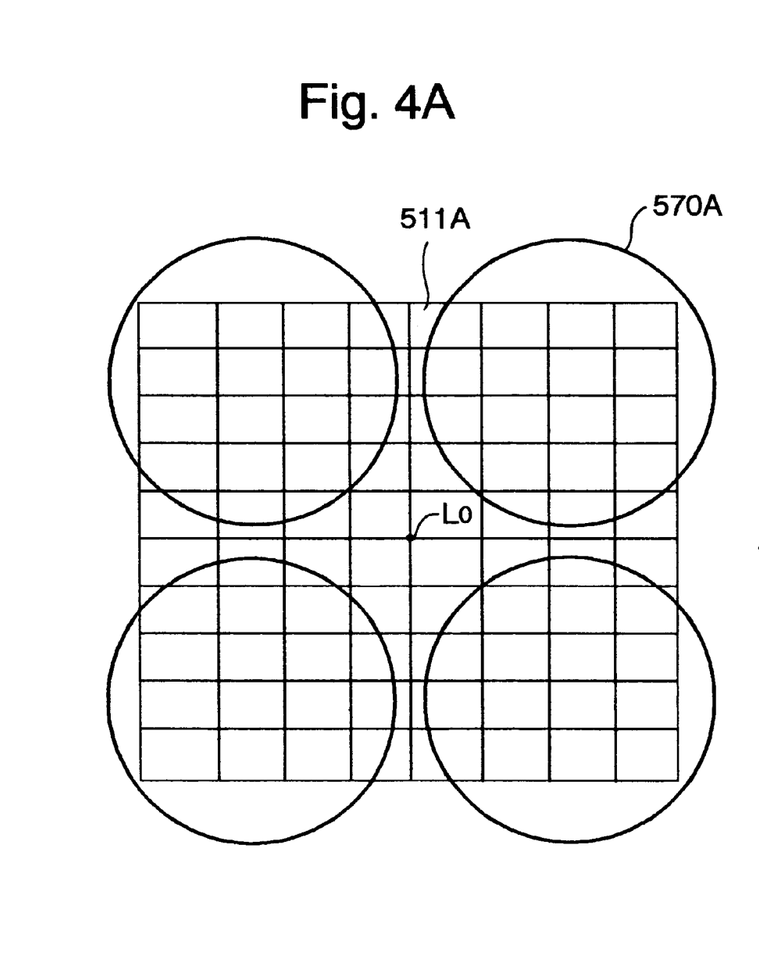
FIGS. 4A and 4B are illustrations showing illumination spots on a fly-eye lens plate of a prior art projection type display device.
Figure 4B:
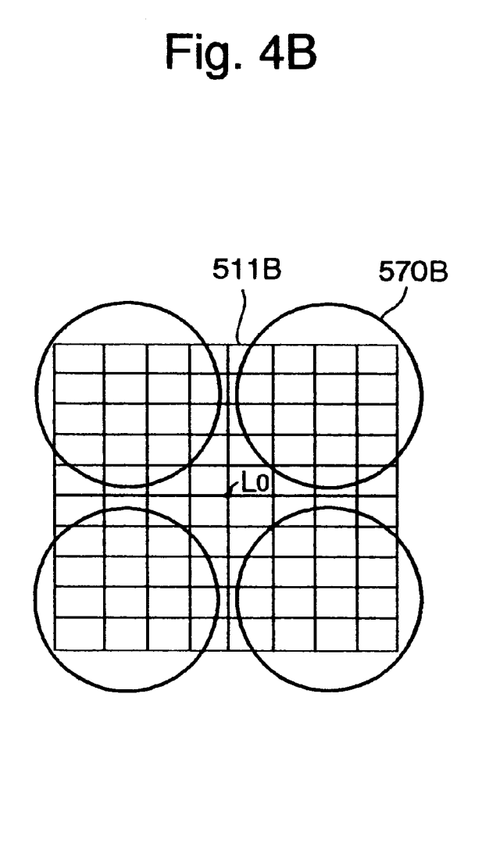

FIGS. 4A and 4B show an illustration of the prior art uniform illumination optical arrangement described in Japanese Unexamined Patent publication No 6-265887. The uniform illumination optical arrangement includes first and second fly-eye lens plates 511B and 511A arranged in parallel with each other in an optical axis Lo. The second fly-eye lens plate 511A is analogous to and smaller than the second fly-eye lens plate 511A and is separated with a specified axial distance so as to transform illumination spots 570A cast on the second fly-eye lens plate 511A into reduced illumination spots 570B and cast them on the second fly-eye lens plate 511B. The reduction ratio of the illumination spot cast on the second fly-eye lens plate 511B to that cast on the second fly-eye lens plate 511A agrees with the reduction ratio of the second fly-eye lens plate 511B to the second fly-eye lens plate 511A. The illumination spot 570A seems to be shifted toward the optical axis Lo, whereas it is only reduced in size according to the reduction ratio of the second fly-eye lens plate 511B to the second fly-eye lens plate 511A, which does not in any way cause a substantive shift of the illumination spot toward the optical axis Lo. Accordingly, the prior art uniform illumination optical arrangement is not accompanied by the effect of shifting the peak of light intensity distribution of the illumination spot on the pupil plane of the projection lens 25 closely to the optical axis Lo.

In contrast to the prior art, the illumination spot is shifted toward the optical axis Lo when cast on the second fly-eye lens plate 11A and is not changed in size between the first and second fly-eye lens plates 11B and 11A. In consequence, the peak of light intensity distribution of the illumination spot is shifted closely to the optical axis Lo on the pupil plane of the projection lens 25, making the projection lens 25 show high image forming performance. Arranging the deflection plate 11C not between but before the second fly-eye lens plate 11A secures a satisfactory image forming properties of the optical system of the projection type display device. The Fresnel-shaped deflection plate 11C which has a significantly reduced thickness makes the integrator 11 compact in the axial direction and provides it at a low cost as compared with an integrator employing a wedge-shaped prism.

Figure 5:
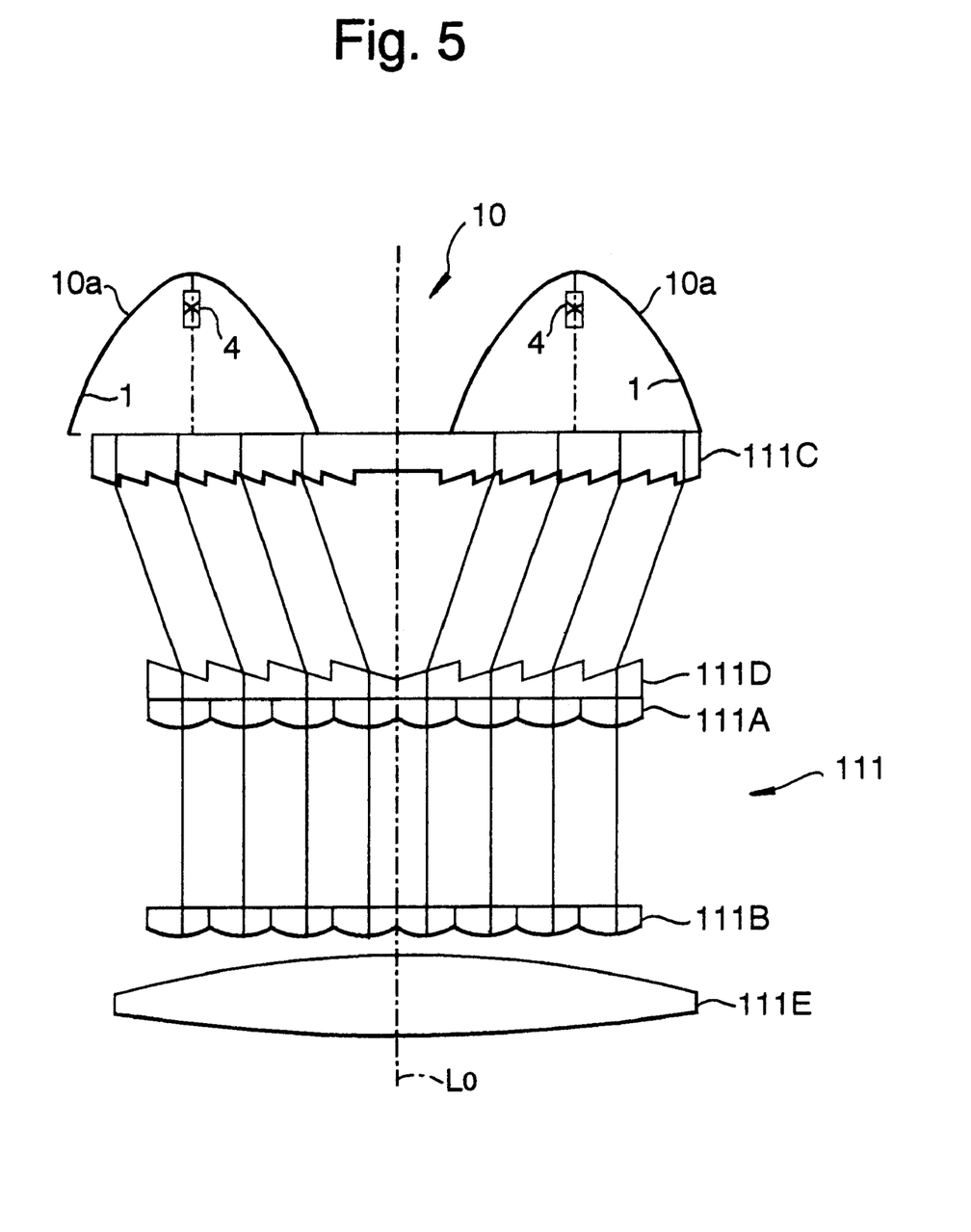
FIG. 5 is a schematic view of a main part of a projection type display device in accordance with another embodiment of the invention.

The integrator 11 for deflecting the bundles of rays incident thereon to translate or shift them as parallel toward the optical axis Lo may be modified with the same effect as shown in FIG. 5. Specifically, as shown in FIG. 5, an integrator 111 is provided with first and second deflection plates 111C and 111D separated at a predetermined distance from each other, each of which has a Fresnel-shaped surface and a flat surface. The first deflection plate 111C at its flat surface is in close proximity to the illumination optical system 10, and the second deflection plate 111D at its flat surface is attached to or situated in close proximity to a second fly-eye lens plate 11A disposed at a predetermined distance from a second fly-eye lens plate 11B. In the same way as the integrator 11, the integrator 111 deflects the bundles of rays incident thereon to translate or shift them as parallel toward the optical axis Lo through the first and second deflection plates 111C and 111D, casting circular illumination spots on the second fly-eye lens plate 11B. The integrator 111 has the same effect as that shown in FIG. 1. That is, the first and second deflection plates 111C and 11D arranged before the second fly-eye lens plate 11A secures a satisfactory image forming properties of the optical system of the projection type display device and makes the integrator 111 compact in the axial direction and provides it at a low cost.

The Fresnel-shaped surface of the deflection plate 111C, 11D consists of a plurality of coaxial polygonal bands inclined at regular angles with respect to the optical axis Lo and leveled with one another, forming a serrate section as shown in FIG. 5. While the first and second deflection plates 111C and 111D are preferred to have the coaxial bands having equal widths identical with the diameter of an eye-element of the fly-eye lens plate, the first deflection plate 111C may be formed to have the coaxial bands narrower than those of the second deflection plate 111C with an effect of reducing the thickness thereof.

The first deflection plate 111C is adapted to shift in opposite axial directions along the optical axis Lo so as to vary an axial distance from the second deflection plate 111D with the result of varying a moved distance of circular illumination spots toward the optical axis Lo on the first fly-eye lens plate 11B. Specifically, the longer the axial distance between the first and second deflection plates 111C and 111D is varied, the greater the moved distance of circular illumination spots correspondingly becomes.

Figure 7A:
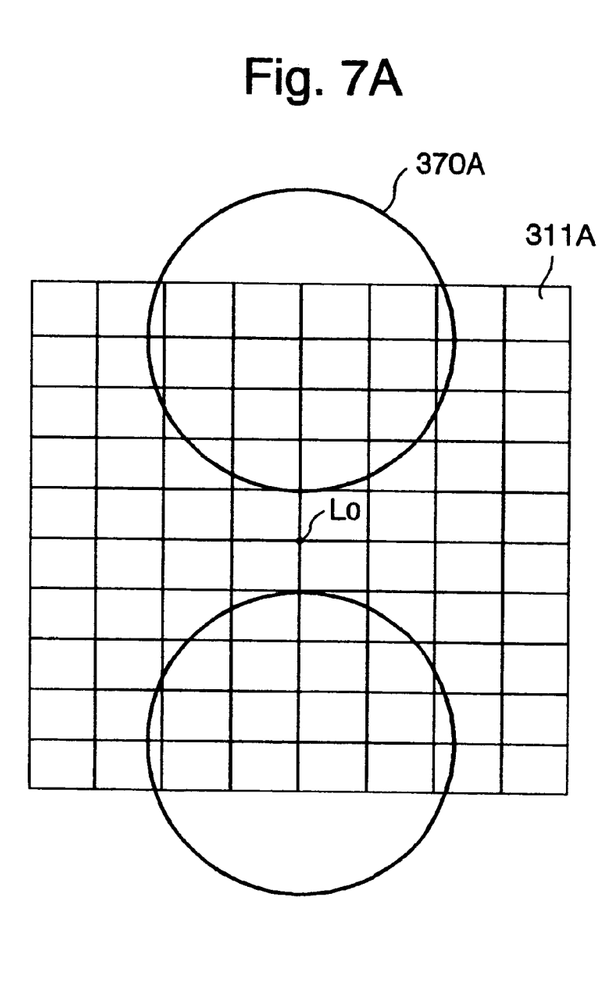
FIGS. 7A and 7B are illustrations showing illumination spots on a fly-eye lens plate of a double light source projection type display device.
Figure 7B:
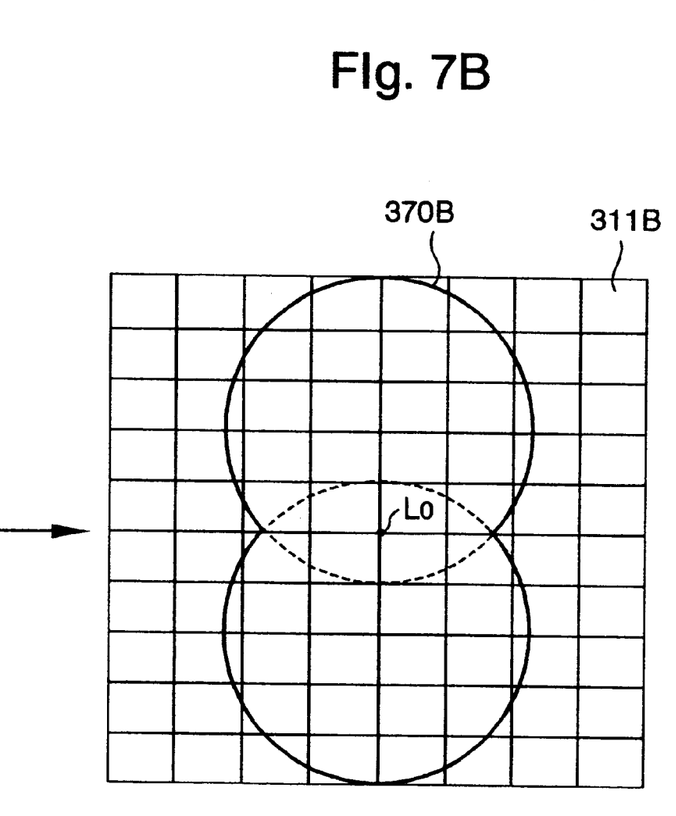

The number of light source assemblies 10a of the illumination optical system 10 is optional as long as more than two. In the case where the projection type display device incorporating the integrator shown in FIG. 1 or 5 has the illumination optical system 10 provided with two light source assemblies 10a arranged symmetrically with respect to the optical axis Lo, circular illumination spots directed toward the integrator 11 or 111 are spatially positioned with respect to the first fly-eye lens plate 311A (11A or 111A) as indicated by a reference character 370A in FIG. 7A before deflected by the deflection plate 11C or 111C and 111D, and are translated or shifted as parallel toward the optical axis Lo and cast on the first fly-eye lens plate 311A as indicated by a reference character 370B in FIG. 7B after deflected by the deflection plate 11C, 11C and 11D. Further, in the case where the projection type display device incorporating the integrator shown in FIG. 1 or 5 has the illumination optical system 10 provided with nine light source assemblies 10a which are arranged in an ordinary matrix with the center one aligned with the optical axis Lo, circular illumination spots directed toward the integrator 11 or 111 are spatially positioned with respect to the first fly-eye lens plate 411A (11A or 111A) as indicated by a reference character 470A in FIG. 8A before deflected by the deflection plate 11C or 111C and 111D, and are translated or shifted as parallel toward the optical axis Lo and cast on the first fly-eye lens plate 411A as indicated by a reference character 470B in FIG. 7B after deflected by the deflection plate 11C, 11C and 11D.

Figure 6B:
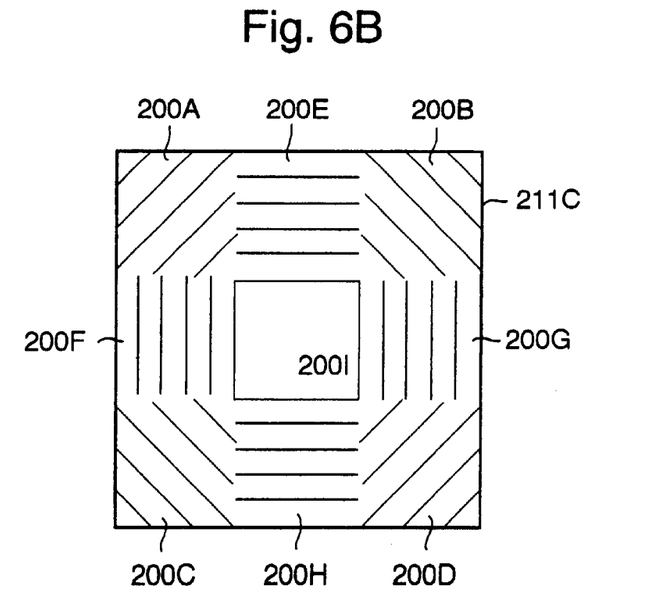
Figure 8A:
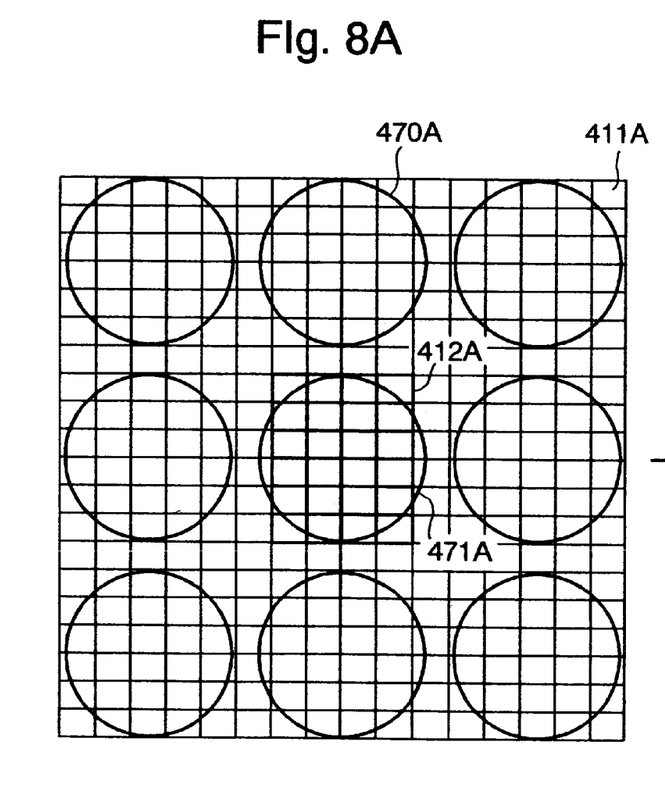
FIGS. 8A and 8B are illustrations showing illumination spots on a fly-eye lens plate of a multiple light source projection type display device.
Figure 8B:
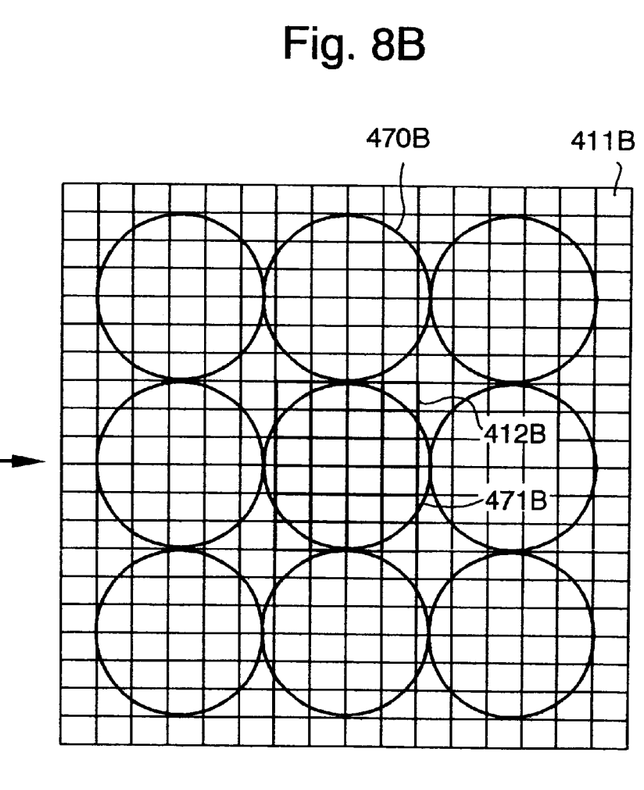

FIG. 6A shows a deflection plate 211C suitable for the illumination optical system 10 provided with four light source assemblies 10a. The Fresnel-shaped surface of deflection plate 211C consists of coaxial square or four-sided bands 200. The band sections for each side are inclined at regular angles with respect to the optical axis Lo and leveled with one another. FIG. 6B shows a deflection plate 211D suitable for the illumination optical system 10 provided with nine light source assemblies 10a. The Fresnel-shaped surface of deflection plate 211D is divided into nine sections 200A to 200I. Each Fresnel-shaped surface section 200A–200H, excepting the central section 200I, consists of a plurality of straight bands 200 inclined at regular angles with respect to the optical axis Lo and leveled with one another. However, the central section 200I which is in aligned with the optical axis Lo may be flat. When one of the light source assemblies 10a is arranged in alignment with the optical axis Lo, the Fresnel-shaped surface of deflection plate 211D includes a flat section 412A positionally corresponding to the one light source assembly 10a to pass the bundle of rays 471A from the one light source assembly 10a without deflection toward the optical axis Lo as shown in FIGS. 8A and 8B.

Figure 9A:
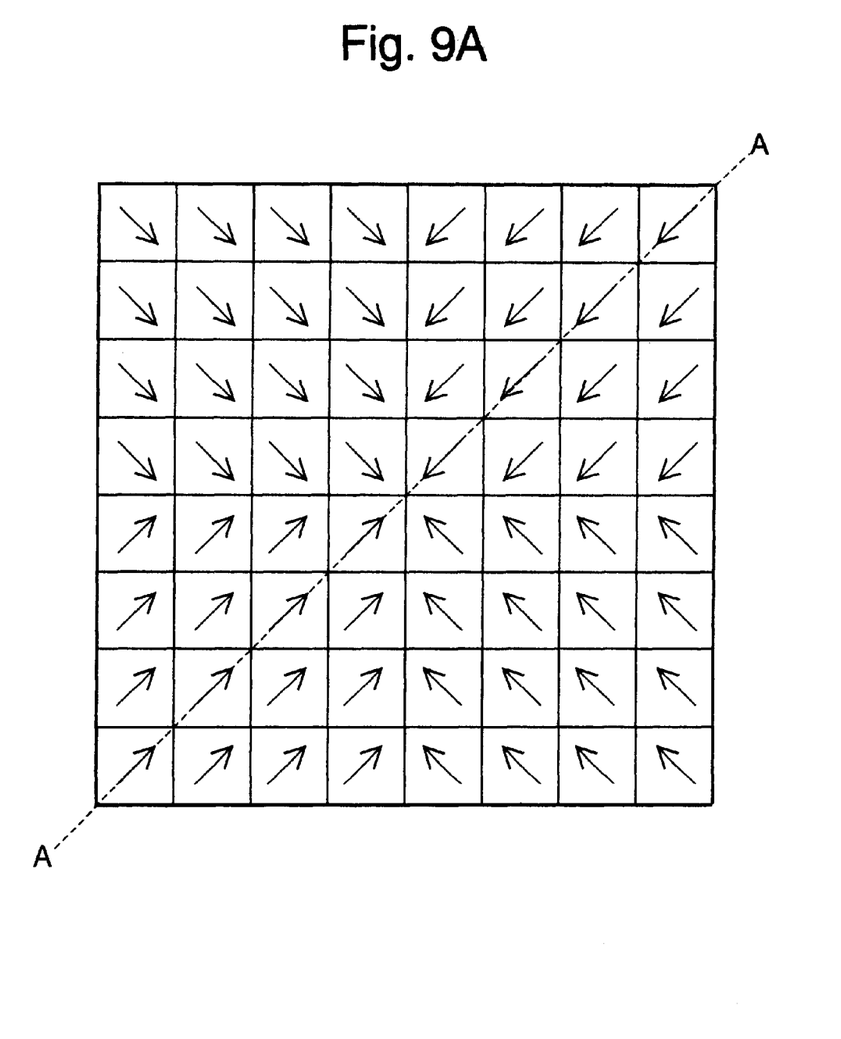
FIG. 9A is a schematic conceptional view showing another deflection plate installed in the projection type display device.
Figure 9B:
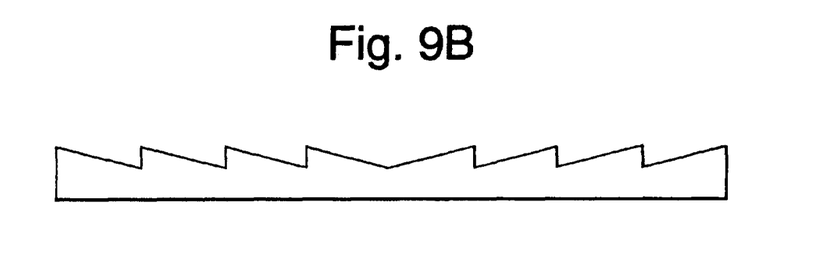
FIG. 9B is a cross-sectional view of a variation of the deflection plate.

The light source assemblies 10a may incorporate a curved mirror reflector such as an ellipsoidal mirror in place with the paraboloide mirror reflector 1 as long as the integrator 11, 111 is structured such that a ratio between distances from the optical axis Lo of an illumination spot before and after a shift of the illumination spot is greater than a reduction ratio of size of the illumination spot before and after the shift of the illumination spot. Further, the deflector plate 11 or 111 may take various forms. For example, in the case where the projection type display device incorporating the integrator shown in FIG. 1 or 5 has the illumination optical system 10 provided with four light source assemblies arranged symmetrically with respect to the optical axis Lo, a deflector may be formed so as to have four sections positionally corresponding to the light source assemblies, each section being formed with a plurality of subsections inclined in a same direction at regular angles with respect to the optical axis Lo as shown in FIG. 9A. A cross section of the deflector taken line A—A in FIG. 9A is shown in FIG. 9B.

While the above description has been directed to the projection type display device which separates an image into three primary color images and recomposing them as a color image for projection of a color image on a screen, the present invention is embodied in a projection type display device for projection of a monochromatic image.

According to the projection type display device of the invention which incorporates an integrator including a pair of integrator optical plates and a multiple light source arrangement, the integrator operates to translate or shift a bundle of rays toward the optical axis such that a shift ratio of a shifted radial distance relative to an original distance before a shift of the bundle of rays is greater than a reduction ratio of a reduced size relative to an original size before the shift of the bundle of rays, so that the illumination spots are shifted closely to the optical axis on the pupil plane of the projection lens with an effect of making the projection lens show high image forming performance. Arranging the Fresnel-shaped deflection plate with multiple surface sections between the multiple light source arrangement and the integrator to translate bundles of rays from the multiple light source arrangement toward the optical axis is contributory to a significantly reduction in thickness of the integrator, which improves the overall compactness in the axial direction and a low manufacturing cost of the integrator significantly as compared with an integrator employing a wedge-shaped prism.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An apparatus which comprises an illuminator including a plurality of light source units, each said light source unit having a luminous body and a reflector for reflecting light from the luminous body toward forward so as to form a component light beam, said plurality of light source units being arranged in a row so as to form a plurality of component light beams, an integrator composed of at least two fly-eye lens plates arranged along an optical axis, that is transverse to said row, said integrator receiving incident light from each of the plurality of component light beams and forming an output, said integrator functioning to make the output more uniform than the incident light from each of the plurality of component light beams; and repositioning means for positioning the light beam from at least one of the light source units so as to approach the optical axis and so that the ratio of change, in the distance from the center of the light beam to the optical axis, is at least as great as the ratio of change in the size or diameter of the light beam as the light beam transits the integrator, said repositioning means comprising:

Fresnel-shaped surfaces disposed in the optical axis between said light source units and said integrator and arranged in parallel to each other with an axial separation, each said Fresnel-shaped surface being divided into a same number of Fresnel-shaped rectangular surface sections as a number of said light source units.

2. The projection type display device as defined in claim 1, wherein said repositioning means comprises first and second Fresnel-shaped surface plates each of which is formed with said Fresnel-shaped parallel surface at one side and a flat surface at another side, said first and second deflection optical plates being movable relatively to each other long the optical axis.

3. An illuminating apparatus comprising:
a plurality of light source units, each comprising a luminous body and a reflector for reflecting light from the luminous body forward so as to form a component light beam parallel to an optical axis of the illuminating apparatus;
an integrator comprising at least two fly-eye lens plates arranged along the optical axis; and
repositioning means for receiving the light beam from at least one of the light source units at a first distance from the optical axis and with a first diameter, and emitting the light beam at a second distance from the optical axis and with a second diameter with the second distance being less than the first distance, wherein a ratio of the first distance to the second distance is at least as great as a ratio of the first diameter to the second diameter.

4. The illuminating apparatus of claim 3, wherein the repositioning means comprises:
first and second Fresnel-shaped surfaces disposed along the optical axis of the illuminating apparatus between the light source units and the integrator, the first and second Fresnel-shaped surfaces being arranged parallel to one another and axially separated from one another, each said Fresnel-shaped surface being divided into a number of optically distinct Fresnel-shaped rectangular surfaces, each of the rectangular surfaces corresponding to one of the light sources.

5. The illuminating apparatus of claim 4, wherein the repositioning means further comprises two separate optical elements, each one of the optical elements comprising one of the first and second Fresnel-shaped surfaces.

6. The illuminating apparatus of claim 5, wherein a distance between the two separate optical elements is adjustable.

7. The illuminating apparatus of claim 6, wherein each of the first and second Fresnel-shaped surfaces is divided into four said Fresnel-shaped rectangular surfaces.

8. The illuminating apparatus of claim 6, wherein each of the first and second Fresnel-shaped surfaces is divided into eight said Fresnel-shaped rectangular surfaces arranged along a perimeter of the three-by-three grid.

9. The illuminating apparatus of claim 8, wherein a central rectangle surrounded by the eight said Fresnel-shaped rectangular surfaces is arranged so that it does not deflect light which passes therethrough.

10. The illuminating apparatus of claim 4, wherein each of the first and second Fresnel-shaped surfaces is divided into four said Fresnel-shaped rectangular surfaces.

11. The illuminating apparatus of claim 4, wherein each of the first and second Fresnel-shaped surfaces is divided into eight said Fresnel-shaped rectangular surfaces arranged along a perimeter of the three-by-three grid.

12. The illuminating apparatus of claim 11, wherein a central rectangle surrounded by the eight said Fresnel-shaped rectangular surfaces is arranged so that it does not deflect light which passes therethrough.

13. The illuminating apparatus of claim 4, wherein each of the light beams received by the repositioning means and the light beams emitted by the repositioning means is parallel to the optical axis.

14. The illuminating apparatus of claim 3, wherein each of the light beams received by the repositioning means and the light beams emitted by the repositioning means is parallel to the optical axis.

* * * * *